United States Patent
Uchida

(10) Patent No.: US 8,095,541 B2
(45) Date of Patent: Jan. 10, 2012

(54) MANAGING ELECTRONIC DATA WITH INDEX DATA CORRESPONDING TO SAID ELECTRONIC DATA

(75) Inventor: Yuki Uchida, Toronto (CA)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 517 days.

(21) Appl. No.: 12/112,709

(22) Filed: Apr. 30, 2008

(65) Prior Publication Data

US 2009/0276413 A1 Nov. 5, 2009

(51) Int. Cl.
*G06F 17/30* (2006.01)

(52) U.S. Cl. ......................................................... 707/741

(58) Field of Classification Search .......................... None
See application file for complete search history.

(56) References Cited

U.S. PATENT DOCUMENTS

| | | | |
|---|---|---|---|
| 6,327,343 B1 | 12/2001 | Epstein et al. | |
| 6,760,721 B1 | 7/2004 | Chasen et al. | |
| 7,058,662 B2 | 6/2006 | Wiggins et al. | |
| 7,072,983 B1 | 7/2006 | Kanai et al. | |
| 2001/0018693 A1* | 8/2001 | Jain et al. | 707/500 |
| 2001/0029512 A1* | 10/2001 | Oshinsky et al. | 707/204 |
| 2002/0128036 A1* | 9/2002 | Yach et al. | 455/552 |
| 2004/0002946 A1* | 1/2004 | Yamaguchi | 707/1 |
| 2004/0034688 A1 | 2/2004 | Dunn | |
| 2004/0054915 A1 | 3/2004 | Jong et al. | |
| 2004/0088313 A1* | 5/2004 | Torres | 707/101 |
| 2005/0021980 A1 | 1/2005 | Kanai | |
| 2006/0143225 A1* | 6/2006 | Brendle et al. | 707/103 R |
| 2007/0005595 A1* | 1/2007 | Gafter | 707/6 |
| 2007/0011149 A1 | 1/2007 | Walker | |
| 2007/0088690 A1 | 4/2007 | Wiggen et al. | |
| 2007/0157100 A1 | 7/2007 | Wiggen | |
| 2007/0162967 A1 | 7/2007 | De Jong et al. | |
| 2007/0198632 A1* | 8/2007 | Peart et al. | 709/203 |
| 2009/0083831 A1 | 3/2009 | Kanai | |

FOREIGN PATENT DOCUMENTS

| | | |
|---|---|---|
| EP | 0935378 A2 | 8/1999 |
| EP | 1039398 A2 | 9/2000 |
| EP | 1507402 A1 | 2/2005 |
| EP | 1852798 A1 | 11/2007 |
| JP | 2002-324024 | 11/2002 |
| WO | WO01/79964 A2 | 10/2001 |

OTHER PUBLICATIONS

Jun. 17, 2009 European search report in connection with a counterpart European patent application No. 09 15 6827.
Bretherton, Francis P., et al., "Metadata: a User's View", IEEE Proceedings, pp. 166-174, Sep. 28, 1994.
Oct. 12, 2009 European search report in connection with a counterpart European patent application No. 09 15 6827.

* cited by examiner

*Primary Examiner* — Mohammad Ali
*Assistant Examiner* — Syed H Hasan
(74) *Attorney, Agent, or Firm* — Cooper & Dunham LLP

(57) ABSTRACT

An improved approach for managing and sending electronic data which allows one to access electronic data corresponding to a hardcopy document is provided. For example, when the hardcopy bearing a visible image is output, an identification image corresponding to identification data identifying the document is added to the visible image. The identification data can be recognized from the identification image, and used to retrieve various information in a database corresponding to the document.

20 Claims, 11 Drawing Sheets

| Item | Image Data stored MFP | Voice Data | Electronic Document (e.g. Excel, Word, PowerPoint, PDF files) |
|---|---|---|---|
| Data ID | | | |
| Data Type | 1 | 1 | 1 |
| Title of File | | | 1 |
| Date Created | | | 1 |
| Date last saved | | | 1 |
| Author | 1 | | 1 |
| Last Saved by | | | 1 |
| Company | | | 1 |
| Date of Call | | 1 | |
| Caller Name | | 1 | |
| Caller ID | | 1 | |
| Receiver Name | | 1 | |
| Receiver ID | 1 | 1 | |
| Date of Operation (print, copy, fax, scan) | 1 | | |
| User Name of operation | 1 | | |
| Type of Operation | 1 | | |
| Location of Original Data | 1 | 1 | 1 |

Fig. 5

| Item | Image Data stored MFP | Voice Data | Electronic Document (e.g. Excel, Word, PowerPoint, PDF files) |
|---|---|---|---|
| Data ID | | | |
| Data Type | 1 | 1 | 1 |
| Tittle of File | | | 1 |
| Date Created | | | 1 |
| Date last saved | | | 1 |
| Author | 1 | | 1 |
| Last Saved by | | | 1 |
| Company | | | 1 |
| Date of Call | | 1 | |
| Caller Name | | 1 | |
| Caller ID | | 1 | |
| Receiver Name | | 1 | |
| Receiver ID | 1 | 1 | |
| Date of Operation (print, copy, fax, scan) | 1 | | |
| User Name of operation | 1 | | |
| Type of Operation | 1 | | |
| Location of Original Data | 1 | 1 | 1 |

MANAGING ELECTRONIC DATA WITH INDEX DATA CORRESPONDING TO SAID ELECTRONIC DATA

TECHNICAL FIELD

This disclosure relates to systems, apparatuses and methodologies for managing electronic data, and in particular, an approach for managing electronic data wherein index data (or metadata) appropriate according to a data type of the electronic data is generated and maintained for the electronic data.

BACKGROUND

In the current information age, it has often been discussed that proliferation of information technology (IT) can lead to more convenience, efficiency, productivity, enjoyment, etc., in life. The extensive use and development of IT facilities in an enterprise (or other organization) environment, as well as in a home environment, has been accompanied by escalating accumulations of electronic data.

There are many instances in which a user (that is, anyone having access to such electronic data) may have a need to search for specific data in a world of heterogeneous data. Such task can be daunting even if a search engine is used. Typically, search tools operate based on one or more keywords, or free text, supplied by the user. Such searches can return large numbers of results, depending on the specific keywords used. However, the results still need to be reviewed for relevancy, since keyword match does not necessarily correlate to relevance. Further, there is generally a remaining concern that the most relevant data is not in the returned results (because the appropriate keyword or free-text for obtaining such data was perhaps not used).

There remains a need for an improved approach for managing electronic data that allows a user to readily reference and/or obtain relevant electronic data, and alleviates the concern that the relevant data has not been found and/or identified.

BRIEF SUMMARY

This disclosure describes tools (in the form of systems, apparatuses and methodologies) for managing electronic data utilizing index data or metadata which allow one, on demand, to identify and/or retrieve relevant data (such as one or more application data, e-mail data, voice data, audio data, video data, image data, graphics data, multi-media data, etc.).

In an aspect of this disclosure, index information indicating a plurality of index items is generated and maintained. Different types of electronic data are associated with respective different subsets of index items, and the index information indicates for each specific type of electronic data a corresponding subset of the index items associated with the specific data type.

In another aspect of this disclosure, for each specific electronic data, the data type of the specific electronic data is determined, the index information is used to determine appropriate index items for the specific electronic data, and metadata corresponding to such appropriate index items are generated for the specific electronic data. That is, the metadata generated and maintained for the specific electronic data corresponds to each specific index item indicated in the index information for the data type of the specific electronic data.

In yet another aspect of this disclosure, when an additional index item is added to the index information, the metadata is updated in view of the newly added index items, on an as-needed basis (that is, for some types of electronic data, the metadata is not modified since the added index item is not relevant to such types of electronic data, as determined by referring to the index information).

The index items and metadata correspond to specific properties of the electronic data that a user can consider for determining (without scrutinizing the electronic data itself) whether the data is relevant and/or for identifying relevant data. For each type of electronic data, there is a different subset of index items that would be of interest to the user.

BRIEF DESCRIPTION OF THE DRAWINGS

The features of this disclosure can be more readily understood from the following detailed description with reference to the accompanying drawings wherein:

FIG. 5 shows an example of an index table;

DETAILED DESCRIPTION

Figure 1:
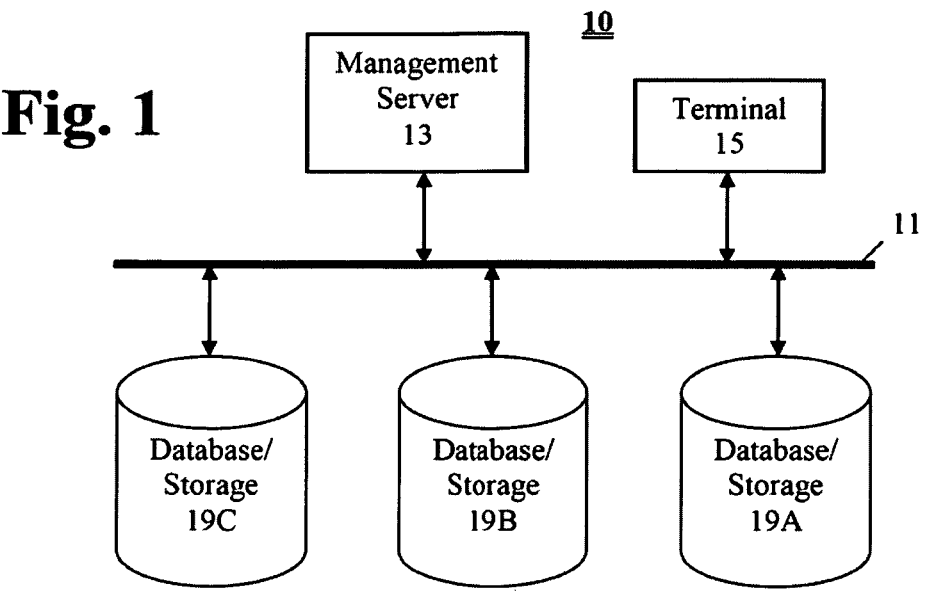
FIG. 1 shows a block diagram of a system, according to an exemplary embodiment of this disclosure.

In describing examples and exemplary embodiments illustrated in the drawings, specific terminology is employed for the sake of clarity. However, this disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, FIG. 1 shows a block diagram of a system for managing electronic data, in an example of this disclosure. System 10 includes a network 11, user terminal 12, management server 13 and databases or data storage parts 19A-19C.

While the example shown in FIG. 1 includes one terminal and three databases or storage parts, it should be appreciated that such numbers of terminals and databases or data storage parts are arbitrary and are selected as an example in order to facilitate discussion, and that the subject matter of this disclosure can be implemented in a system including one or more terminals and one or more databases or data storage parts. Further, it is noted that a terminal and a database or data storage part can included in one integrated device (or of course can be separate devices).

Each of the databases or storage parts 19A-19C can comprise one or more structural or functional parts that have or support a storage function. For example, each of the databases or data storage parts 19A-19C can be, or can be a component of, a source of electronic data, such as an e-mail server, a file server, a multi-function peripheral device (MFP or MFD), a voice data server, an application server, etc. Accordingly, it should be appreciated that the term "electronic data" as used herein, in its broadest sense, can comprise any data that a user may wish to access, retrieve, review, etc.

Each database or storage part can store a corresponding type of data (for example, storage part 19A stores image data, storage part 19B stores electronic documents, and storage part 19C stores voice data, etc.) or multiple types of data (for example, storage part 19A stores image data and e-mail data, storage part 19B stores electronic documents and application files, and storage part 19C stores voice data, audio data, video data, multimedia files, etc.), with the type(s) of data stored in one storage part being mutually exclusive from, or alternatively overlapping with, the type(s) of data stored in another storage part. Further, the databases or storage parts 19A-19C are shown as distinct parts (for example, resident in respective servers or multi-function devices), each connected to network 11. However, in another example, the databases or storage parts 19A-19C may be resident in one device, such as a multi-function device wherein storage part 19A stores image data from scan operations in the multi-function device, storage part 19B stores image data from print operations in the multi-function device, storage part 19C stores image data from facsimile operations in the multi-function device, etc. In any event, the management server 13 tracks and monitors the various types of data that are stored in the databases or data storage parts 19A-19C.

Figure 2:
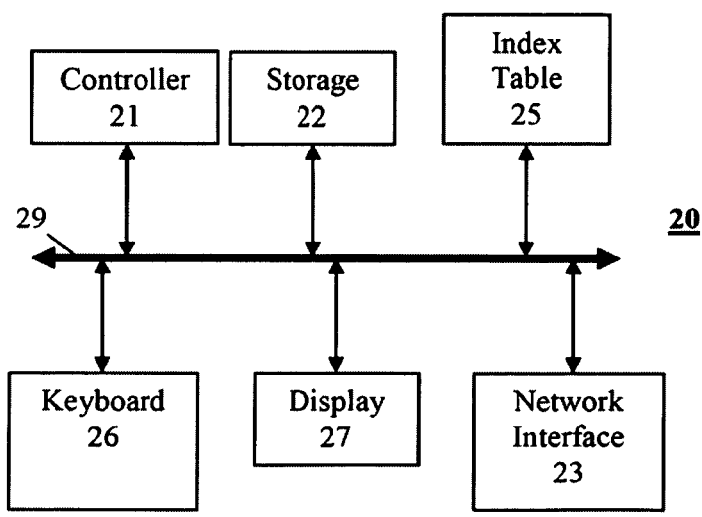
FIG. 2 shows a block diagram of a management server, according to an exemplary embodiment of this disclosure.

FIG. 2 shows an exemplary constitution of a management server. As shown in FIG. 2, management server 20 includes a controller (or central processing unit) 21 that communicates with a number of other components, including memory or storage part 22, network interface 23, keyboard 26 and display 27, by way of a system bus 29.

The management server may be a special-purpose device (such as including one or more application specific integrated circuits or an appropriate network of conventional component circuits) or it may be software-configured on a conventional personal computer or computer workstation with sufficient memory and processing capabilities, as will be appreciated to those skilled in the relevant arts. Further, if adequate storage, processing and communication capabilities are included, the computing device can double as a database server and/or as a print server (which in many respects can be configured similarly).

In server 20, controller 21, memory/storage 22, network interface 23, keyboard 26 and display 27 are conventional, and therefore in order to avoid masking the inventive aspects of this disclosure, such conventional aspects will not be discussed in detail herein.

The controller 21 executing program code instructions controls server operations, including maintaining index table 25 which includes index information indicating various index items represented in the index table and indicating for each specific type of electronic data a corresponding subset of the index items associated with the specific type of electronic data.

An example of an index table is shown in FIG. 5. Data type and location of data are index items common to each type of data. In the example of FIG. 5, the index items for image data are author, receiver ID (such as network address of device from which data was received), type of operation (print, copy, fax, scan, etc.), date of operation and name of user who performed the operation, the index items for voice data are date of call, caller name, caller ID (that is, telephone number), receiver name and receiver ID, and the index items for electronic documents are title or name of file, date created, date last saved, author, last saved by and company.

It should be apparent that index information in the subject matter of this disclosure is not limited to the index items shown in FIG. 5 which merely present an example. Further, although index information is maintained in the form of an index table in the exemplary embodiment of FIG. 2, it should be apparent to those skilled in the art that the index information can be organized in any of various manners that do not involve a table. For example, such index information or index data can be organized as data objects through object-oriented programming, and/or via linked lists, data linking, a dynamic or relational database, etc.

Figure 6:
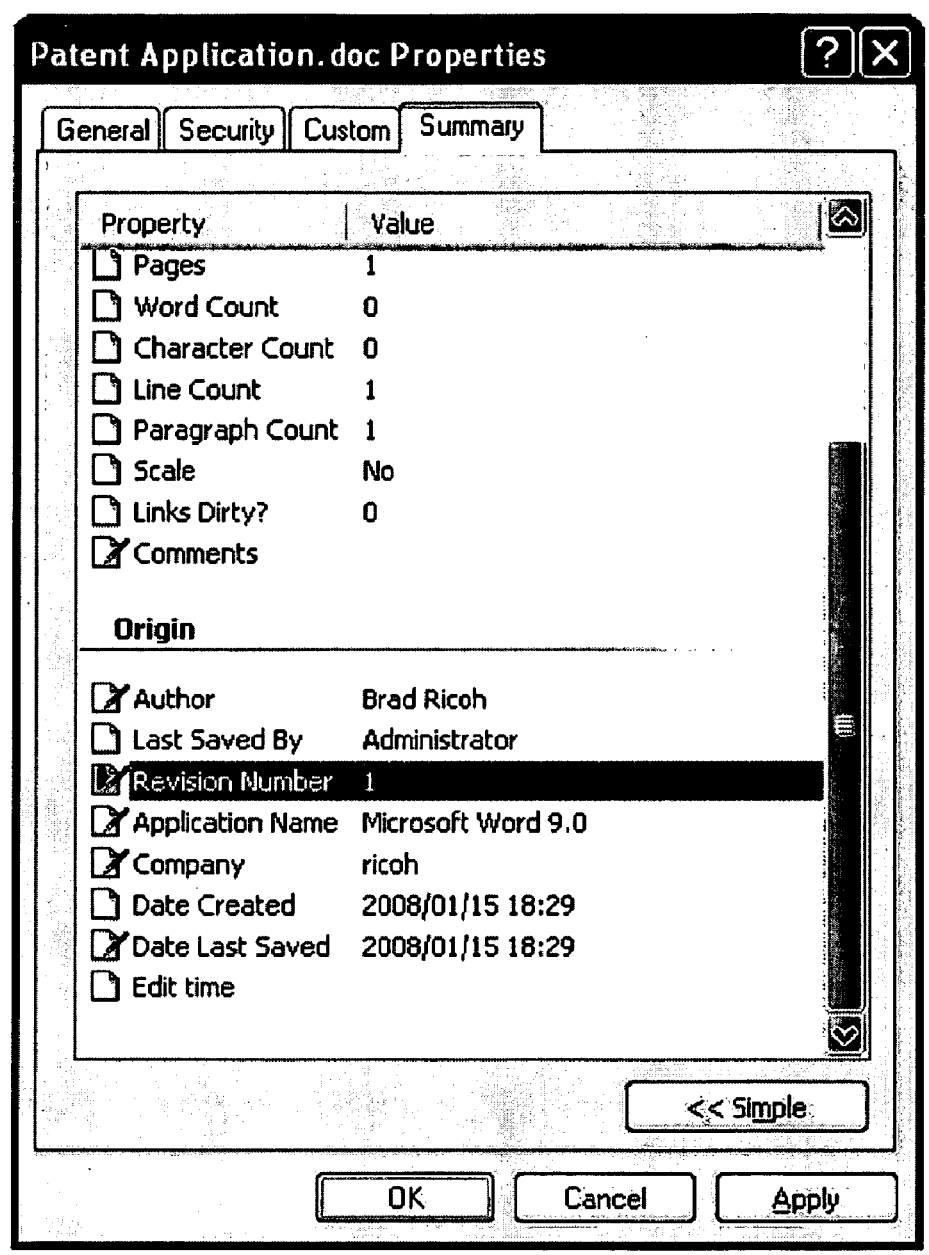
FIG. 6 shows an example of a user interface screen showing a summary of properties of an electronic document.

As mentioned above, the management server 13 tracks and monitors the various types of data that are stored in the databases or storage parts 19A-19C. For each specific electronic data, the management server 13 determines the data type of the specific electronic data, uses the index table to determine appropriate index items for the specific electronic data, and generates and maintains metadata corresponding to such appropriate index items for the specific electronic data. The index items associated in the index table with a specific data type, in a preferred embodiment, correspond to appropriate properties of data of the specific data type. Thus, each metadata for the specific electronic data is in accord with one or more properties of the specific electronic data. An example of a user interface screen showing a summary of properties of an electronic document is shown in FIG. 6.

As an example, metadata maintained for specific electronic image data can indicate an operation (e.g., print, facsimile, scan, etc.) last performed in connection with the specific electronic image data. In another example, the data management part includes in metadata maintained for specific electronic mail data a copy of header and body data of the specific electronic mail data. As another example, the data management part includes in metadata maintained for specific electronic voice data date, caller identification and receiver identification of the specific electronic voice data.

Additional index items can be added to the index table. For example, the management server 13 can provide a user interface through which a user or system administrator can add such index items. In another example, one or more index items can be added through an automated (software-driven) system update. In yet another example, the management server 13, through its monitoring of the databases or storage parts, determines that new data stored in one of the databases or storage parts includes properties that require an additional index item to be created and added to the index table, and proceeds either to automatically create and add such additional index item to the index table, or to prompt a user (who is, for example, author, last user to modify or save the data) or administrator to add such index item.

In any event, when an index item is added to the index table, the management server 13 updates, for each electronic data, the metadata appropriately in view of the added index item. For some types of electronic data, the metadata is not modified since the added index item may not be relevant to such types of electronic data, as determined by referring to the index information.

The data management part 13 can monitor access to each specific electronic data, and maintain usage history metadata indicating the specific accesses to the specific electronic data. The usage history metadata maintained for the specific electronic data can indicate, for example, identification of a user who last accessed the specific electronic data and time and date of that last access. In another example, the usage history metadata maintained for the specific electronic data can indicate a destination to which the specific electronic data was transmitted.

In the example shown in FIG. 2, the management server 20 includes the network interface 23 for communications through a network, such as communications through the network 11 with the terminal 12 and/or databases or storage parts 19A-19C in FIG. 1. However, it should be appreciated that the subject matter of this disclosure is not limited to such configuration. For example, the management server may communicate with the databases or storage parts through direct connections and/or through a network to which the user terminal is not connected. As another example, the data management apparatus need not be a server that services client terminals, but rather may communicate with the terminal on a peer basis, or in another fashion.

The network 11 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 11. In addition, the network 11 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

The user terminal 12 can be any computing device, including but not limited to a personal, notebook or workstation computer, a kiosk, a PDA (personal digital assistant), a mobile phone or handset, another information terminal, etc., that can communicate through the network 11 with other devices. Although only one user terminal is shown in FIG. 1, it should be understood that the system 10 can include a plurality of user terminal devices (which can have similar or different configurations).

The terminal 12 can interact (exchange data) with the management server 13 via the network 11, so as to benefit from the services provided by the server. For example, a request to retrieve data from the databases or storage parts 19A-19C can be sent from the terminal 12 to the server 13. As another example, the terminal 12 can transmit data to be deposited in the database, and other information may be communicated as well, such as, for example, user identification, password, the name of the person sending the data, the name of the author of the data, the date and time of creation or modification of the data, the version of the data, etc.

Figure 3:
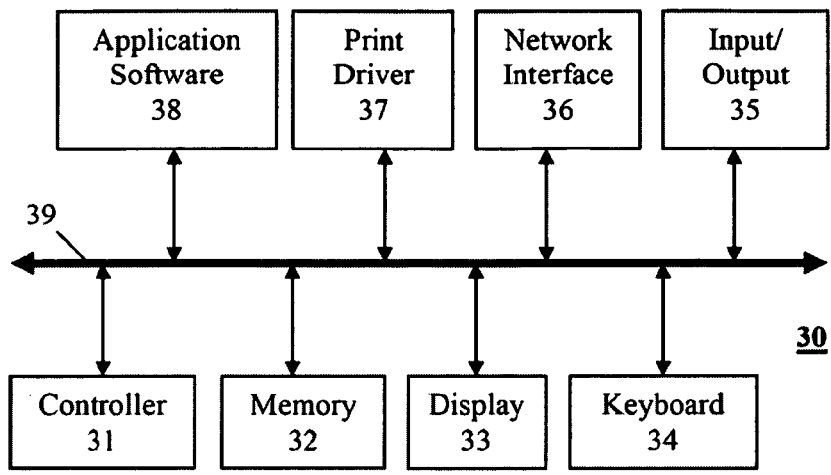
FIG. 3 shows a block diagram of an exemplary configuration of a terminal shown in FIG. 1.

An example of a configuration of the user terminal (for example, as a computer) is shown schematically in FIG. 3. In FIG. 3, computer 30 includes a controller (or central processing unit) 31 that communicates with a number of other components, including memory 32, display 33, keyboard (and/or keypad) 34, other input/output (such as mouse, touchpad, stylus, microphone and/or speaker with voice/speech interface and/or recognition software, etc.) 35, network interface 36, print driver 37 and application software 38, by way of internal bus 39.

The memory 32 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 36 provides a connection (for example, by way of an Ethernet connection or other network connection which supports any desired network protocol such as, but not limited to TCP/IP, IPX, IPX/SPX, or NetBEUI) to network 11.

Print driver 37 and application software 38 are shown as components connected to the internal bus 39, but in practice are typically stored in storage media such as a hard disk or portable media, and/or received through the network 11, and loaded into memory 32 as the need arises.

A user interface is provided and is configured through software natively or received through a network connection, to allow the user to access electronic data or content on the terminal and/or via the network, interact with network-connected devices and services, enjoy other software-driven functionalities, etc. For example, a browser (such as Internet EXPLORER™, NETSCAPE NAVIGATOR™, a proprietary browser, etc.) may be provided on the terminal so that a user of the terminal can use browsing operations to access the databases or storage parts 19A-19C in system 10.

Additional aspects or components of the computer 30 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
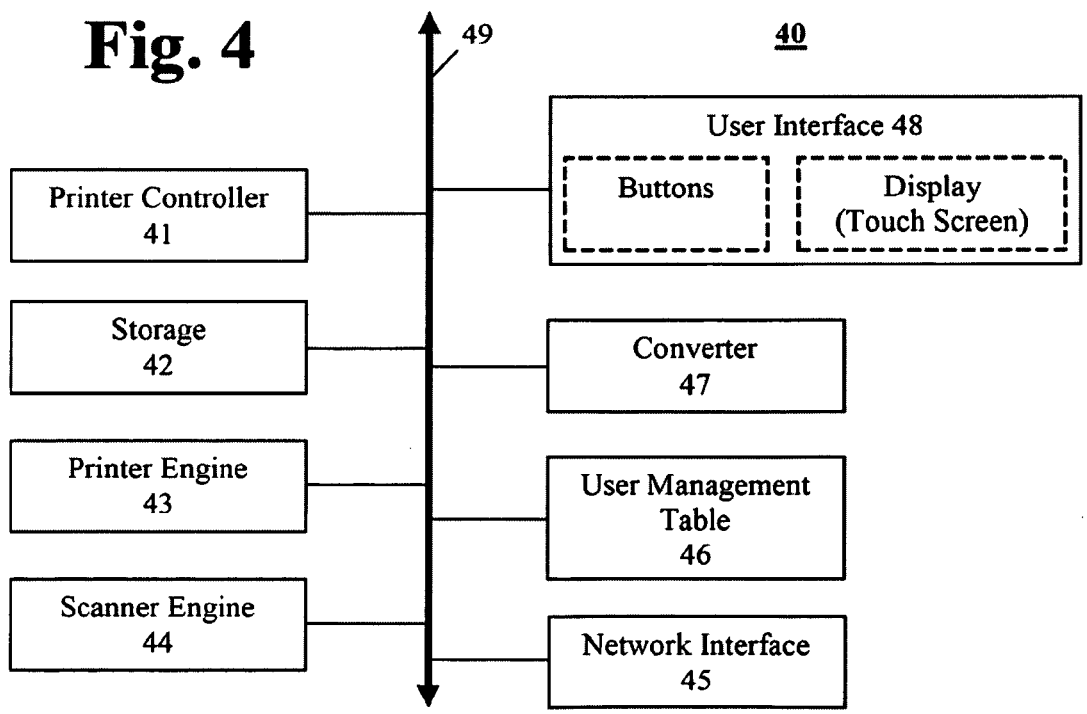
FIG. 4 shows a block diagram of a multi-function apparatus, according to an exemplary embodiment of this disclosure.

An example of a multi-function device (MFD) or multifunctional peripheral device (MFP) which includes scanning and printing functions, and additionally can serve as a user terminal for entering, saving and accessing electronic data, and in which one or more databases or data storage parts can be resident will be discussed below with reference to FIG. 4.

MFP apparatus 40 can include a controller 41, and various elements connected to the controller 41 by an internal bus 49. The controller 41 controls and monitors operations of the MFP 40. The elements connected to the controller 41 include storage 42 (for example, random access memory, read-only memory, hard disk drive, portable storage media drive such as for optical discs, magnetic discs, magneto-optical discs, etc., semiconductor memory cards, combinations of storage media, etc.), printer engine 43, scanner engine 44, network interface (I/F) 45, converter 47 for converting data from one format to another format (for example, a format suitable for printing, faxing, e-mailing, etc.), and user interface 48. The controller 41 also utilizes information stored in user management table 46 to authenticate the user and control user access to the functionalities of the MFP.

Storage 42 can include one or more storage parts or devices, and program code instructions can be stored in one or more parts or devices of storage 42 and executed by the controller 41 to carry out the instructions. Such instructions can include instructions for performing specified functions (such as printing, scanning, faxing, copying, e-mailing, etc.) of the MFP, to enable the MFP to interact with a terminal and/or the management server (for example, 13, 20, etc.), as well as perhaps other external devices, through the network interface 45, and to control the converter 47, access data in the user management table 46, and interactions with users through the user interface 48.

The user interface 48 includes one or more display screens that display, under control of controller 41, information allowing the user of the MFP 40 to interact with the MFP. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP, so as to allow the operator to interact conveniently with services provided on the MFD, or with the MFD serving as terminal for accessing electronic data or other content through the network. For example, a browser (such as Internet EXPLORER™, NETSCAPE NAVIGATOR™, a proprietary browser, etc.) may be provided on the MFD so that the operator can use browsing operations to access the databases or storage parts 19A-19C in system 10. As another example, the operator can scan a document, and use the browser to upload the image data from scanning of the document (and specify additional information associated with the image) to one of the databases or storage parts 19A-19C.

The display screen does not need to be integral with, or embedded in, a housing of the MFP, but may simply be coupled to the MFP by either a wire or a wireless connection. The user interface 48 may include keys and/or buttons (such as graphical keys or buttons, or other graphical elements, of a GUI on a touchscreen display) for inputting information or requesting various operations. Alternatively, the user interface 48 and the display screen may be operated by a keyboard, a mouse, a remote control, voice recognition, or eye-movement tracking, or a combination thereof.

Since the MFP 40 is typically shared by a number of users, and is typically stationed in a common area, the MFP preferably prompt the user to supply authentication information, such as user name (or other user or group information), password, access code, etc. The authentication information can be compared to data stored in the user management table 46 to confirm that the user is authorized to use the MFP. The authentication information may also be stored for the session and automatically supplied if access to other devices through the network requires it. On the other hand, such other devices may prompt the user to supply other authentication information through the user interface.

Another way for authenticating a user is for a user to swipe an access card through a card reader (not shown). Such access card can include user identification information, as well as account information to enable the management server to identify and authenticate the user, determine any credits remaining in the user (or group) account and allow such information to be displayed at the MFP upon request of the user.

Other methods of authentication may also be used. For example, the multi-function device may be equipped with one or more biometrics means (such as comparing fingerprints, palm prints, voice or speech, retinas or irises, facial expressions or features, signature, etc.).

Printer engine 43, scanner engine 44 and network interface 45 (similar to interface 23 in FIG. 2 and interface 36 in FIG. 3) are otherwise conventional, and therefore, a detailed description of such conventional aspects are omitted in the interest of clarity and brevity (so as not to mask the novel aspects of the subject matter of this disclosure).

The MFD 40 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

An exemplary embodiment wherein the subject matter of this disclosure is applied to an electronic discovery (or data indexing) system is described infra with reference to FIGS. 7-13. Electronic discovery is a process whereby a party to a legal proceeding (or even some nonparties, having a legal obligation in more restricted circumstances) in the United States provide requested information or documents in electronic form (that is, electronic data). In electronic discovery, problems arise with respect to, in many instances, vast quantities of electronic documents and/or data that must be reviewed, whether for a party's document/data production in a litigation against another party, for conducting an internal investigation, or for satisfying government reporting requirements. A party's ability to manage each matter that can be mission critical depends on how fast it can capture, identify, review, assess, and produce relevant documents and data. The volume of electronic documents and data can far exceed paper documents.

An electronic discovery (or data indexing) system, with the subject matter of this disclosure applied therein, allows a party to quickly and systematically categorize or index the electronic data. For example, using such a system, a user or administrator can specify index items of interest for each type of data subject to discovery. The index information is generated and maintained, and additional index items can be added throughout the process. The generation and maintenance of index information can be both automatic and manual and can be ongoing throughout the electronic discovery process. That is, the system can proceed to analyze properties of the electronic data to determine index items, with or without user input or selection of index items for each data type. As new data is acquired, the index information may be modified or additional index information may added. Thus, generation and maintenance of index information can be ongoing throughout the electronic discovery process.

Figure 7:
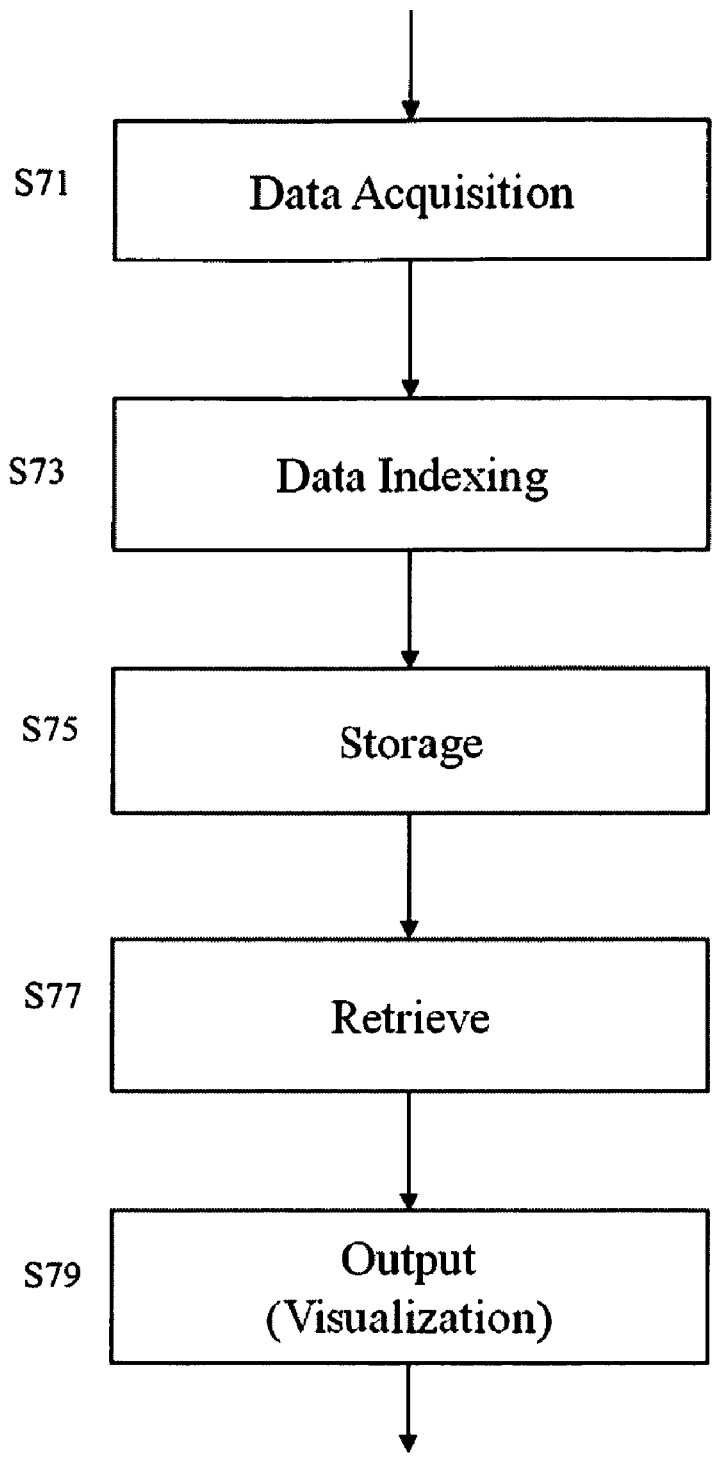
FIG. 7 shows a flow chart for a data indexing or electronic discovery process, in accordance with an exemplary embodiment of this disclosure.
Figure 8:
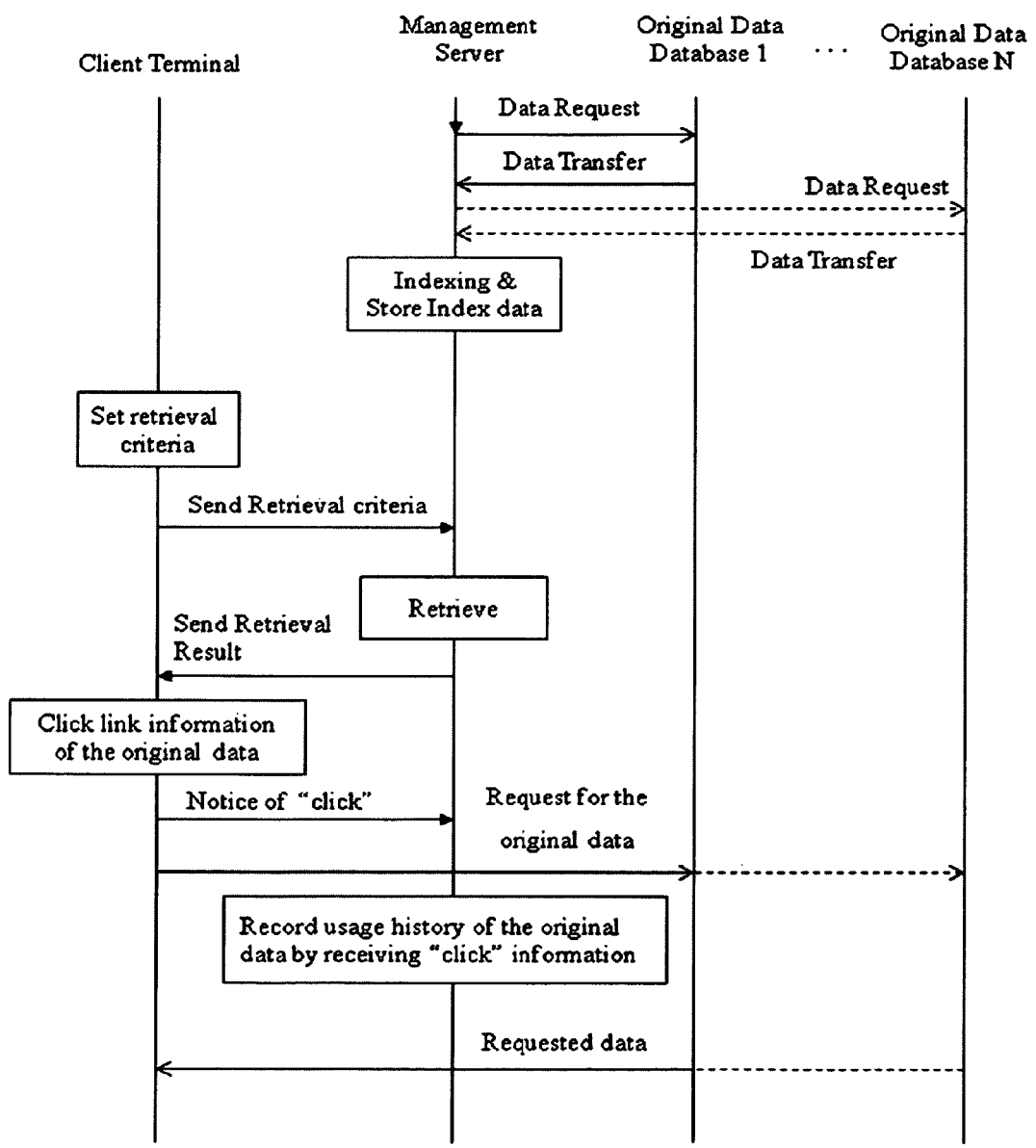
FIG. 8 shows data flow in the process of FIG. 7.

A general workflow and data flow in the system will now be described with reference to FIGS. 7 and 8.

When electronic data to be indexed becomes available, a data management part (management server) of the system automatically acquires the data to be indexed from the database or storage part in which the data is stored (step S71). The acquisition can entail the management server transmitting a data request, and receiving a data transfer in response to the request. The data transfer can entail an electronic data at a time, or more typically a number of electronic data that can be accommodated within a data packet transmitted from the database or storage part to the management server.

After the transferred electronic data is received by the management server, the management server proceeds to index the received data (step S73), that is, generate metadata based on properties of the data, without user input. The metadata is stored by the data management part (step S75). Steps S71-S75 are iteratively performed until all of the electronic data stored in the databases or storage parts have been indexed.

During the course of data acquisition and indexing, a copy of the original data is temporarily stored for the purpose of analyzing the data and generating metadata, and the copy of the original data is deleted after corresponding metadata has been generated. Since the quantity of metadata stored by the data management part for a specific set of electronic data is generally much less than the data quantity of the set itself, the volume of data stored by the management server can be greatly reduced.

After metadata has been generated through the indexing, a user, via a user interface (such as supplied via a browser or client software on the user terminal), can specify retrieval criteria (step S75). The data management part compares the specified criteria (typically, specified values, or ranges of values, of selected or specified properties) to the stored metadata to determine electronic documents or data that satisfy the specified criteria, and returns a list of such documents or data via the user interface to the user for review. The list preferably includes links, with associated URL (uniform resource locator), to the documents or data. Thus, the user can click on a link to request the corresponding original data.

In response to user selection, a request for the selected document or data (that is, the original data stored in the databases or storage parts) is transmitted to the database or storage part storing the selected document or data, and the database or storage part in turn transfers the requested document or data to the user terminal and via one or more storage or transmission media (step S77). Incidentally, as an optional feature, the management server can update usage history represented in the metadata associated with the requested document or data to reflect the request from, or transfer of the document or data to, the user terminal.

After the transferred document or data is received at the user terminal, the document or data can be output via a display or a printer (step S79).

An example of a method performed by the management server for indexing the electronic document or data is explained below with reference to FIG. 9.

When the electronic document or data is acquired, a copy of the original data is stored temporarily in order to allow indexing to be performed (step S91). In step S92, it is determined whether metadata for the electronic data has already been stored in the index management table. If metadata for the electronic data has already been stored in the index management table (step S92, Y), the server proceeds to step S98 and skips steps S93-S97 for the particular data.

On the other hand, if metadata for the electronic data has not already been stored in the index management table (step S92, N), the stored copy of the original data is processed for indexing according to data type (step S93). Such processing will be described with reference to FIG. 10.

First, the server determines the data type of the particular electronic data and stores metadata indicating the data type in the index management table for the particular data (step S101).

If the particular data corresponds to image-type data (step S101, image), a character recognition part of the server performs character recognition on the data (step S102) and recognized characters are stored as metadata in the index management table for the particular data, along with metadata corresponding to index items indicated in the index table to correspond to image-type properties (step S103).

If the particular data corresponds to data type of electronic document (step S101, electronic document), such as a file generated by application such as Word, PowerPoint, Excel, Acrobat, etc., file properties corresponding to index items associated with electronic documents are extracted from the document data and stored as metadata in the index management table for the electronic document (step S104).

If the particular data corresponds to data type of e-mail (step S101, e-mail), header and body data of e-mail are extracted from the e-mail and stored as metadata in the index management table for the e-mail data (step S105).

If the particular data corresponds to data type of voice (step S101, voice), date of call, caller ID and receiver ID properties are extracted from the voice data and stored as metadata in the index management table for the e-mail data (step S106). Additional properties such as caller name, receiver name, etc., if available, are extracted and stored as metadata as well.

Figure 9:
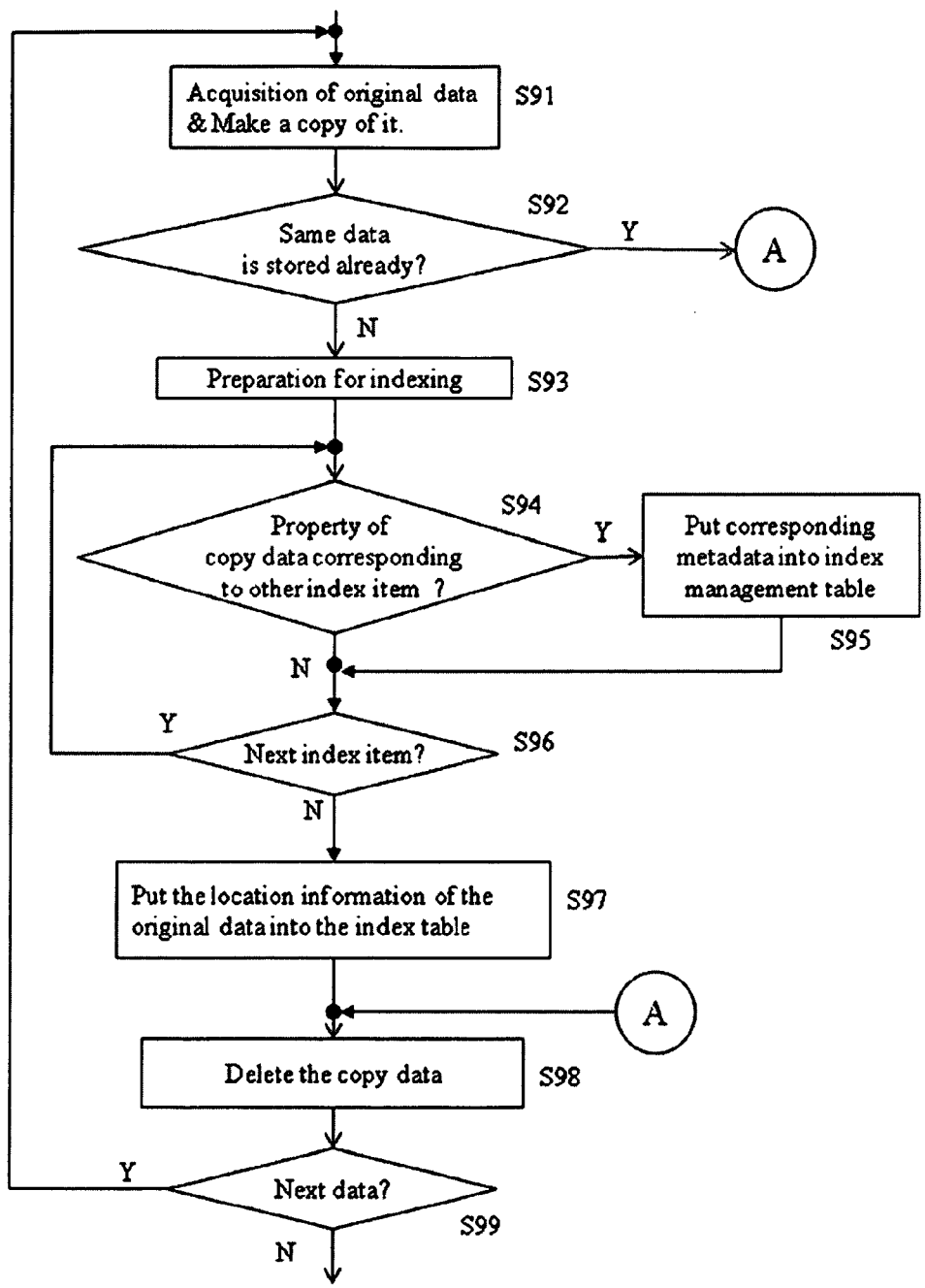
FIG. 9 shows a flow chart for an indexing method, in an exemplary embodiment of this disclosure.
Figure 10:
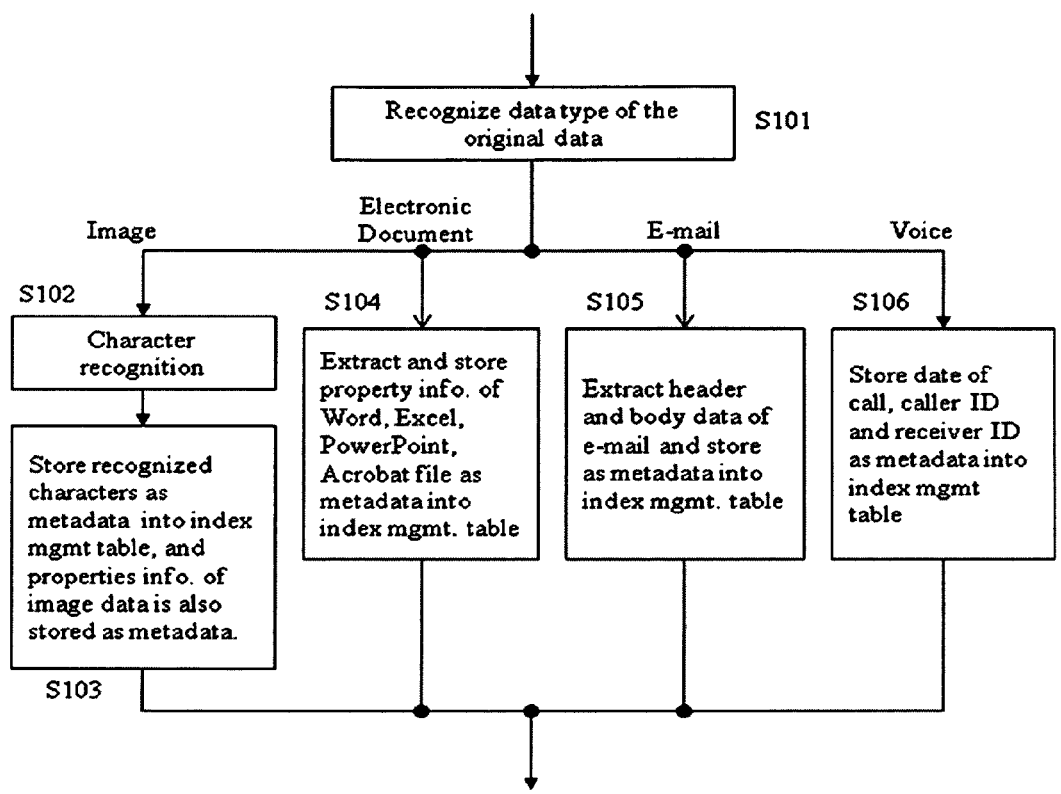
FIG. 10 shows a flow chart of a method for preparing for indexing, in an exemplary embodiment of this disclosure.

Back to the method of FIG. 9, the server determines whether for each additional index item not yet considered, the particular data includes properties corresponding to such additional index item (step S94). If the particular data includes properties corresponding to the additional index item (step S94, Y), the server generates metadata corresponding to the additional index item and stores it in the index management table for the electronic data (step S95). On the other hand, if the electronic data does not include any properties corresponding to the additional index item (step S94, N), the server determines whether there is another index item that has not yet been considered with respect to the particular electronic data (step S96). If there is another index item (step S95, Y), steps S94-S96 are repeated.

If all index items have been considered with respect to the particular electronic data (step S96, N), location information indicating where the original data is stored in the database or storage part is stored in the index management table for the particular electronic data (step S97).

In step S98, the server deletes the copy data. Next, the server checks whether additional electronic data is available to be acquired (step S99). If additional electronic data is available to be acquired (step S99, Y), the server returns to step S91 and the process of steps S91-S99 is performed for the additional data.

In the example of FIG. 9, the server deletes the copy data in step S98 and then checks in step S99 whether additional electronic data is available to be acquired. On the other hand, in another example, the server checks whether additional electronic data is available to be acquired, and deletes copy data only when no additional electronic data is available to be acquired.

Figure 11:
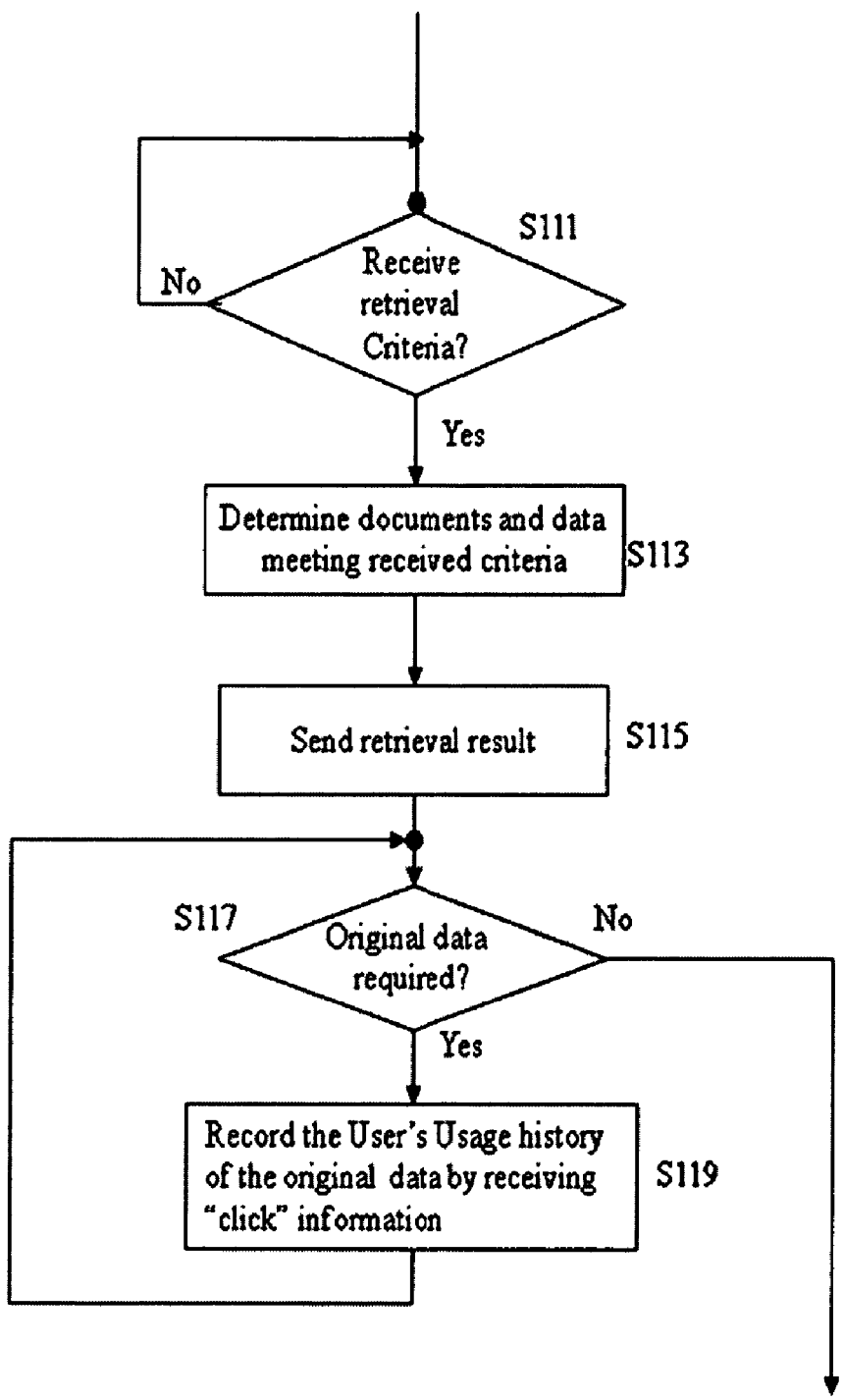
FIG. 11 shows a flow chart for a retrieval method, in an exemplary embodiment of this disclosure.

A method for the management server to process requests to retrieve stored documents or data will now be discussed with reference to FIG. 11.

When the server is not occupied with indexing data (or even when the server is in the middle of indexing data), the server is repeatedly monitoring for retrieval requests (step S111). When retrieval criteria are received (step S111, Yes), the server proceeds to process the retrieval criteria and compare the specified criteria to the metadata in the index management table to determine electronic documents or data that satisfy the specified criteria (step S113). Next, the server returns to the requesting terminal the results of the comparison identifying such documents or data that meet the specified criteria (step S115). The results preferably are presented to the user in a user interface that allows the user to retrieve the original data of (for example, by clicking on a link supplied in the user interface to) one of the electronic documents or data identified in the results. The request of the original data of the selected electronic document or data may be supplied directly to the database or storage part storing the original data, or the request may be relayed through the server. In either instance, the server monitors such clicking or retrieval action (step S117). If the user does not select any of the results for retrieval, then the server takes no additional action in connection with the received retrieval criteria (step S117, No). On the other hand, if the user retrieves the original data of a selected electronic document or data (step S117, Yes), the server updates the usage history metadata of the electronic document or data to reflect such access (step S119).

A process for adding a new index item, in an exemplary embodiment of this disclosure, will now be discussed with reference to FIGS. 12 and 13.

As mentioned hereinabove, new index item(s) can be added either automatically or manually in the system (step S121). For example, a new index item can be added based on request from a user terminal. After a new index item is added, the management server determines the metadata stored in the index management table that may require updating based on the added new index item. For each electronic document or data having such metadata stored in the index management table, the server identifies the location metadata stored in the index management table for the electronic document, transmits an acquisition request to access the location, acquires the original data for the electronic document by data transfer from the database or storage part storing the original data, and makes a copy of the original data (step S122). The server determines whether the electronic document or data has the properties corresponding to the new index item (step S125). If the electronic document or data has the properties corresponding to the new index item (step S125, Y), the server generates metadata based on such properties associated with the new index item and stores the metadata in the index management table (step S126).

In any event, the server then checks whether there is an additional new index item (step S127). If there is an additional new index item (step S127, Y), the server repeats steps S125-S127 with respect to the additional new index item.

On the other hand, if there is no additional new index item (step S127, N), the server checks whether metadata stored in the index management table for another electronic document or data requires updating with regard to the new index item(s) (step S128). If there is metadata stored in the index management table for another electronic document or data that requires updating with regard to the new index item(s) (step S128, Y), steps S122-S128 are repeated for such other electronic document or data. On the other hand, if there no other electronic document or data that requires updating with regard to the new index item(s) (step S128, N), all of the stored copy data are deleted (step S129).

After the index management table has been updated for the new index item(s), when a retrieval request is received, the server will process the retrieval request, as discussed in connection with FIGS. 7, 8 and 11, and the retrieval results will be generated based on the updated management index table.

Figure 12:
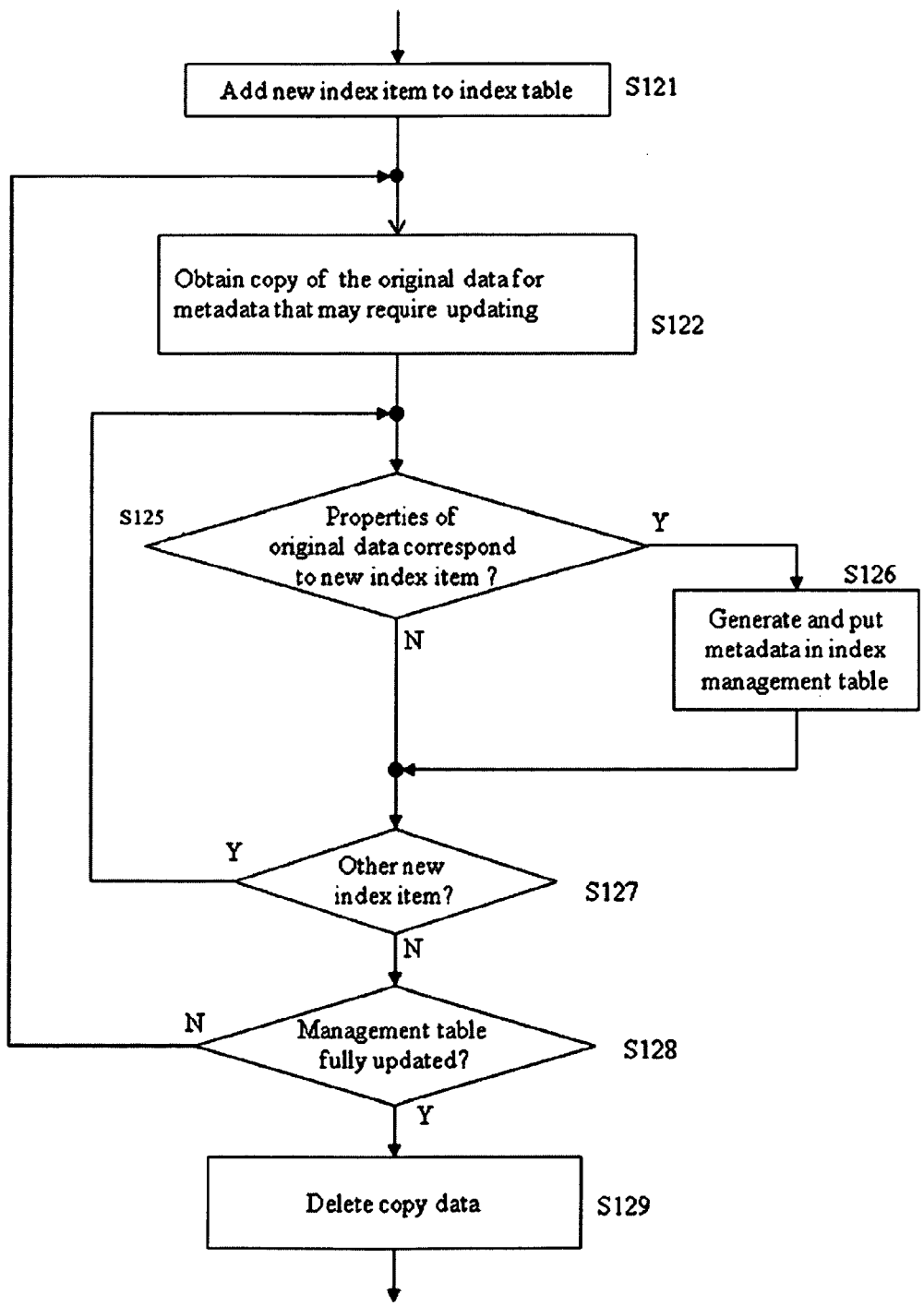
FIG. 12 shows a flow chart of a method for adding a new index item, in an exemplary embodiment of this disclosure.
Figure 13:
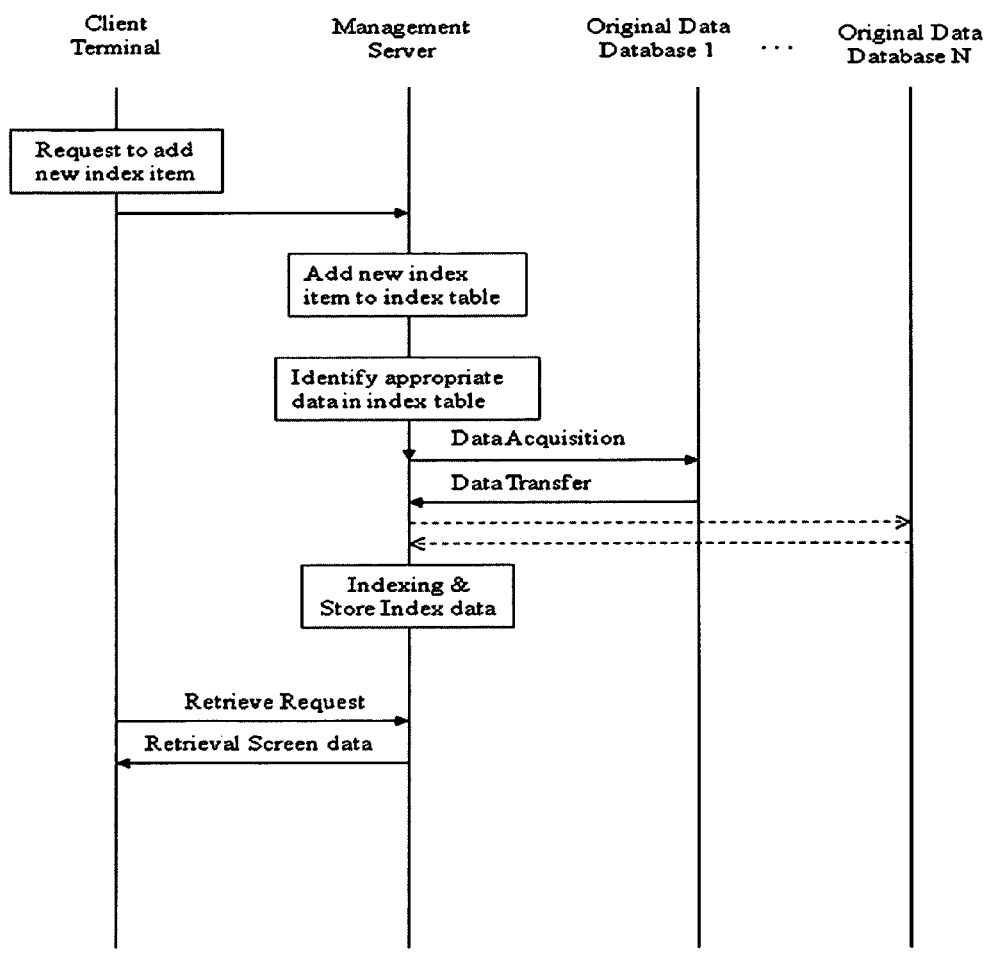
FIG. 13 shows data flow in the method of FIG. 12.

In the example of FIGS. 12 and 13, the server deletes all of the stored copy data at the end of the updating process, that is, only when no additional electronic document data for which updating of metadata is needed. On the other hand, in another example, the copy data for an electronic document or data is deleted after updating of metadata for the electronic document or data is completed, and then the server checks whether an additional electronic document or data for which metadata updating may be needed.

The above-mentioned data management methodologies, apparatuses and systems may be one or more computer programs which are executable by a computer and tangibly embodied in a program storage medium (such as optical disks, magneto-optical disks, floppy diskettes, ROMs, RAMs, EPROMs, EEPROMs, FLASH memory, any type of media suitable for storing electronic instructions, etc.) readable by a computer. The program(s) may include a plurality of parts, executions of which may be distributed over a plurality of computers, terminals or other electronic devices which communicate with each other over a network or other transmission media.

The above-mentioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. An apparatus for managing electronic data stored in one or more data storage parts, said apparatus comprising:
   an index information storage part configured to store index information indicating a plurality of data types of electronic data and a plurality of index items, and indicating, for each specific data type of the plurality of data types, a corresponding subset of one or more of said plurality of index items that are associated with, and relevant to, the specific data type of electronic data; and
   a data management part configured to maintain said index information stored in said index information storage part, and generate and maintain for each specific electronic data, metadata corresponding to each specific index item of the corresponding subset of said index items indicated in the index information as being associated with and relevant to the data type of the specific electronic data,
   wherein each metadata for a particular electronic data is in accord with a corresponding data property of the particular electronic data, and
   wherein when an additional index item is added to said index information along with an indication that the additional index item is associated with and relevant to a first data type, said data management part automatically generates, for each particular electronic data of the first data type, additional metadata corresponding to said additional index item for the particular electronic data based on data properties extracted from the particular electronic data that are associated with the additional index item, and
   additional metadata for a specific electronic data of the first data type is automatically generated based on data properties associated with the additional index item that are extracted from the specific electronic data and additional metadata for another electronic data of the first data type is automatically generated based on data properties associated with the additional index item that are extracted from said another electronic data.

2. The apparatus as claimed in claim 1, wherein when the additional index item is added to said index information, said data management part determines for each particular electronic data stored in said one or more data storage parts whether the particular electronic data includes a data property that corresponds to the additional index item, and if the particular electronic data includes said data property, said data management part generates, for the particular electronic data, additional metadata that corresponds to the additional index item.

3. The apparatus as claimed in claim 1, further comprising:
   a data type recognition part configured to determine a data type of additional electronic data,
   wherein said data management part generates for the additional electronic data additional metadata corresponding to the index items indicated by the index information as being associated with the data type of the additional electronic data.

4. The apparatus as claimed in claim 1, wherein said data management part monitors access to each specific electronic data, and maintains usage history metadata indicating the specific accesses to the specific electronic data.

5. The apparatus as claimed in claim 4, wherein said usage history metadata maintained by said data management part for the specific electronic data indicates for at least a last access of the specific electronic data, identification of a user who accessed the specific electronic data and time and date of said last access.

6. The apparatus as claimed in claim 4, wherein said usage history metadata maintained by said data management part for the specific electronic data indicates for a transmission of the specific electronic data, a destination to which the specific electronic data was transmitted.

7. The apparatus as claimed in claim 1, wherein said data management part includes in the metadata maintained for specific electronic image data stored in said data storage part, indication of one of print, facsimile and scan operations last performed to the specific electronic image data.

8. The apparatus as claimed in claim 1, wherein said data management part includes in the metadata maintained for specific electronic voice data stored in said data storage part, date, caller identification and receiver identification of the specific electronic voice data.

9. The apparatus as claimed in claim 1, wherein said data management part is configured to receive, from a user terminal via a network, a retrieval request including criteria for determining requested data, generate retrieval results by comparing said retrieval criteria to said metadata, and for each of the retrieval results, send to the user terminal retrieval information based on a location of original data specified by the retrieval result.

10. The apparatus as claimed in claim 1, wherein when the additional index item is added to said index information for the first data type, the data management part identifies all of the electronic data, stored in said one or more data storage parts, that corresponds to the first data type, and automatically generates, for each particular electronic data of the first data type, additional metadata corresponding to said additional index item for the particular electronic data.

11. The apparatus as claimed in claim 1, wherein the additional index item is added to said index information for the first data type, a certain time after the data management part begins maintaining said index information stored in said index information storage part.

12. A system for managing electronic data utilizing index data, said system comprising:
a data storage part configured to store electronic data of a plurality of data types;
a user terminal coupled to a network;
an index information storage part configured to store index information indicating a plurality of index items, and indicating, for each specific data type of the plurality of data types of said electronic data stored in said data storage part, a corresponding subset of one or more of said plurality of index items that are associated with, and relevant to, the specific data type of electronic data; and
a data management part configured to maintain said index information in said index information storage part, generate and maintain for each specific electronic data, metadata corresponding to each specific index item of the corresponding subset of said index items indicated in the index information for the type of the specific electronic data, receive from said user terminal a retrieval request indicating a retrieval criteria, generate one or more retrieval results by comparing said retrieval criteria to said metadata, each generated retrieval result specifying original data having metadata matching the retrieval criteria, and, for each of the generated retrieval results, send to the user terminal retrieval information including a link to a storage location of said original data specified by the generated retrieval result,
wherein when an additional index item is added to said index information along with an indication that the additional index item is associated with and relevant to a first data type, said data management part automatically generates, for each particular electronic data of the first data type, additional metadata corresponding to said additional index item for the particular electronic data based on data properties extracted from the particular electronic data that are associated with the additional index item, and
additional metadata for a specific electronic data of the first data type is automatically generated based on data properties associated with the additional index item that are extracted from the specific electronic data and additional metadata for another electronic data of the first data type is automatically generated based on data properties associated with the additional index item that are extracted from said another electronic data.

13. The system as claimed in claim 12, wherein when the additional index item is added to said index information for a plurality of data types, said data management part automatically generates, for each electronic data of each data type included in said plurality of data types and stored in said data storage part, additional metadata corresponding to the additional index item and for the electronic data.

14. The system as claimed in claim 12, further comprising a data type recognition part configured to determine a data type of additional electronic data, wherein said data management part generates for the additional electronic data additional metadata for the index items indicated by the index information to correspond to the data type determined by said data type recognition part.

15. The system as claimed in claim 12, wherein said data management part is configured to monitor selection from said data terminal of specific electronic data from said retrieval results sent to the data terminal, and record the selection in usage history metadata maintained by said data management part for the specific electronic data.

16. The system as claimed in claim 12, further comprising:
an image character recognition part configured to recognize characters in an electronic image,
wherein said data management part includes in the metadata maintained for electronic image data stored in the data storage part, the recognized characters of the specific electronic image data.

17. A method for managing electronic data utilizing index data, by an electronic data management apparatus, said method comprising the steps of:
(a) maintaining index information indicating a plurality of data types of electronic data and a plurality of index items, and indicating, for each specific data type of the plurality of data types, a corresponding subset of one or more of said plurality of index items corresponding to the specific data type of electronic data;
(b) determining a data type of specific electronic data;
(c) generating and maintaining for the specific electronic data, metadata corresponding to each specific index item of the corresponding subset of said index items indicated in the index information for the data type, determined in step (b), of the specific electronic data;

(d) adding an additional index item to said index information along with an indication that the additional index item is associated with and relevant to at least one data type; and
(e) automatically generating for each electronic data of a data type included in said at least one data type, additional metadata corresponding to the additional index item based on data properties extracted from said electronic data that are associated with the additional index item, wherein additional metadata for a specific electronic data of the first data type is automatically generated based on data properties associated with the additional index item that are extracted from the specific electronic data and additional metadata for another electronic data of the first data type is automatically generated based on data properties associated with the additional index item that are extracted from said another electronic data.

18. The method as claimed in claim 17, further comprising:
inserting in the metadata maintained for specific electronic image data, indication of one of print, facsimile and scan operations last performed to the specific electronic image data; and
inserting in the metadata maintained for specific electronic voice data, date, caller identification and receiver identification of the specific electronic voice data.

19. The method as claimed in claim 17, further comprising:
receiving from a data terminal, a retrieval request including criteria for determining requested data; and
sending to the data terminal results corresponding to the retrieval request;
monitoring selection from the data terminal of specific electronic data from said results sent to the data terminal; and
recording the selection in usage history metadata maintained for the specific electronic data.

20. The method as claimed in claim 17, further comprising:
maintaining in the metadata for specific electronic data, indication of a source of the specific electronic data.

* * * * *